United States Patent [19]

Hashimoto

[11] Patent Number: 4,784,413
[45] Date of Patent: Nov. 15, 1988

[54] END OF THIN-WALLED METAL TUBING OF SMALL DIAMETER COUPLED TO FLANGE

[75] Inventor: Yasuaki Hashimoto, Tagata, Japan

[73] Assignee: Usui Kokusai Sangyo Kabushiki Kaisha, Nagasawa, Japan

[21] Appl. No.: 147,176

[22] Filed: Jan. 22, 1988

[51] Int. Cl.⁴ .............................................. F16L 23/00
[52] U.S. Cl. .................... 285/416; 285/422
[58] Field of Search ................................. 285/416, 422

[56] References Cited

U.S. PATENT DOCUMENTS 2,669,467 2/1954 Wolferz ................................. 285/416
3,909,049 9/1975 Blatnica ........................... 285/416 X

FOREIGN PATENT DOCUMENTS 2549282 5/1977 Fed. Rep. of Germany ...... 285/416

Primary Examiner—Dave W. Arola
Attorney, Agent, or Firm—Anthony J. Casella; Gerald E. Hespos

[57] ABSTRACT

An assembly comprising a thin-walled metal tubing coupled to a flange. The tubing is used as a passage for supplying oil or air, and has a small diameter. A short metal cylinder having a wall thickness larger than that of the tubing is fitted over the tubing. The tubing and the cylinder are welded together at their front ends. The cylinder to which the tubing is welded is inserted in a hole formed in the flange. The outer surface of the cylinder is welded to the fringe of the hole.

7 Claims, 1 Drawing Sheet

PRIOR ART

END OF THIN-WALLED METAL TUBING OF SMALL DIAMETER COUPLED TO FLANGE

BACKGROUND OF THE INVENTION

1. Field of the Invention

The present invention relates to a metal tubing which is made of a carbon steel or stainless steel and having a diameter less than about 20 mm and a wall thickness less than about 1.5 mm and which is frequently used as a passage for supplying oil or air in an automobile, machine, equipment, apparatus, or the like and, more particularly, to an improved structure of the end of such a relatively thin-walled tubing of a relatively small diameter which is coupled to a flange by welding.

2. Description of the Prior Art

The manner in which a conventional structure of this kind is fixed to a flange by welding is next described by referring to FIG. 3. The connected end portion of a tubing P' is directly inserted into a hole 12 formed in a flange 11 shaped like a plate or board. Then, the end portion of the tubing is manually heated using a gas burner or the like to weld it to the inner wall 13 of the hole 12 at locations 14.

This prior art structure has some disadvantages. Specifically, because the connected end portion of the tubing P' is directly inserted into the hole 12 in the flange 11 and welded at 14, and because of a quite large difference in wall thickness between the tubing P' and the flange 11 and the manual heating operation using the burner, the tubing P' and the flange, especially the tubing P', are often locally overheated to melt a part of the tubing, resulting in a thin-walled portion 15 as shown in FIG. 4. This reduces the mechanical strength of this part. Also, the shape varies from product to product when bent. Further, when the structure is used under undesirable conditions, if it is connected to a base or subjected to vibration, then the portion of the tubing P' which was heated is cracked or broken or causes leakage while it is in use.

SUMMARY OF THE INVENTION

It is an object of the present invention to provide a thin-walled metal tubing which has a small diameter and can be welded to a flange differing greatly in wall thickness from the tubing by a manual heating operation using a burner without presenting any of the foregoing problems, whereby the possibility that the tubing is cracked or broken or causes leakage near the welded portion is eliminated or reduced while it is in use.

The above object is achieved by an assembly comprising a thin-walled metal tubing which has a small diameter and a connected end portion welded to a short metal cylinder having a larger wall thickness than that of the tubing at their front ends, the assembly further including a flange shaped like a plate or board, the flange being provided with a hole in which the cylinder is fitted in such a way that the rear portion of the cylinder protrudes from the upper surface of the flange, the outer surface of the cylinder being welded to the fringe of the hole in the flange.

In one feature of the invention, the wall thickness of the rear portion of the cylinder decreases towards the center of the tubing.

DETAILED DESCRIPTION OF THE PREFERRED EMBODIMENT

Figure 1:
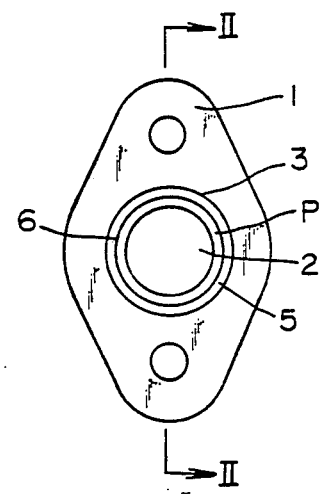
FIG. 1 is a front elevation of an assembly comprising a thin-walled metal tubing which has a small diameter and the rear portion of which is welded to a flange, the assembly being fabricated in accordance with the invention.
Figure 2:
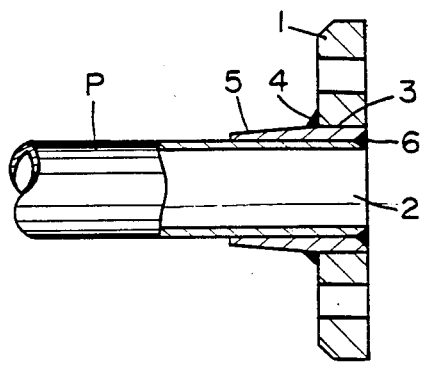
FIG. 2 is a partially cutaway cross section taken along line II—II of FIG. 1.
Figure 3:
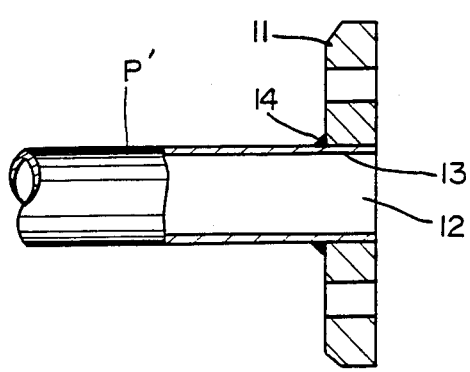
FIG. 3 is a partially cutaway vertical cross section of a conventional assembly.
Figure 4:
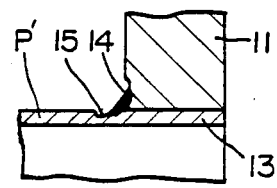
FIG. 4 is an enlarged view of one welded portion of the assembly shown in FIG. 3.

Referring to FIGS. 1 and 2, a flange 1 shaped like a plate or board has a hole 2 extending along the axis of the flange. The flange 1 is made of a carbon steel or stainless steel and provided with an outer hole for attachment to a base. A thin-walled tubing P which has a small diameter is made of a metal, such as a carbon steel or stainless steel. A short metal cylinder 5 consisting of a carbon steel or stainless steel, for example, has a wall thickness larger than that of the tubing P. The cylinder 5 is fitted over the connected end portion of the tubing P. The cylinder 5 and the tubing P are welded together at their front ends 6. The cylinder 5 to which the tubing P is welded is inserted in the hole 2 in the flange 1 in such a way that the rear portion of the cylinder 5 protrudes from the upper surface of the flange 1. The outer surface 3 of the cylinder 5 is welded to the fringe of the hole 2 at 4.

As described above, the thick-walled metal cylinder 5 which is manufactured independent of the tubing P is fitted over the connected end portion of the tubing P, and they are welded together at their front ends 6. The cylinder 5 fitted over the tubing P is inserted in the hole 2 in the flange 1 in such a way that the rear portion of the cylinder 5 protrudes from the upper surface of the flange 1. The cylinder 5 is welded to the flange 1 at 4. When the tubing P is coupled to the flange 1 by a manual heating operation using a burner, even if the tubing P and the flange 1 vary quite greatly in wall thickness, the wall of the tubing P is prevented from becoming thinner due to local overheating because of the three features, i.e., (1) that the separate cylinder 5 is fitted over the tubing P, (2) that the cylinder 5 and the tubing P are welded together at their front ends 6, and (3) that the cylinder 5 and the flange 1 are welded together at locations 4. Also, it is easy to manage the welding operation. Further, the mechanical strength of the portion of the tubing P which is located around the welded contact portions can be greatly improved.

As described above, the novel assembly comprising the thin-walled and small metal tubing the end portion of which is fixed to the flange by welding has the advantage that the portion of the tubing P near the welded contact portions has a greatly enhanced mechanical strength. Therefore, the shape does not vary from product to product when bent. Additionally, if the assembly is connected to a base or subjected to vibration under undesirable conditions, the possibility that the tubing P is cracked or broken or causes leakage near the welded contact portions can be eliminated or reduced. In this way, the novel structure is quite useful.

What is claimed is:

1. An assembly comprising:
    an elongated thin-walled metal tubing having a small diameter and having a front longitudinal end;

a metal cylinder having opposed front and rear longitudinal ends defining a length substantially less than the length of the tubing and having a wall thickness larger than that of the tubing, the cylinder being fitted over the tubing with the respective front ends thereof being generally aligned, the cylinder and the tubing being welded together at their front ends but the rear end of the cylinder being free of welded connection to the tubing; and a flange having a hole in which the cylinder is fitted in such a way that the rear longitudinal end of the cylinder protrudes from a surface of the flange, the outer surface of the cylinder being welded to the surface of the flange adjacent the hole therein.

2. The assembly of claim 1, wherein the wall thickness of the rear portion of the metal cylinder decreases towards the center of the tubing.

3. The assembly of claim 1, wherein the flange is made of a carbon steel or stainless steel.

4. The assembly of claim 1, wherein the metal cylinder is made of a carbon steel or stainless steel.

5. The assembly of claim 1, wherein the tubing is made of a carbon steel or stainless steel.

6. The assembly of claim 1, wherein the flange has a thickness substantially greater than the thickness of the thin-walled metal tubing.

7. The assembly of claim 1 wherein the flange has opposed first and second surfaces, the cylinder being welded to the flange adjacent the first surface thereof and with front ends of said tubing and said cylinder being substantially aligned with the second surface of said flange.

* * * * *